United States Patent [19]

Williams et al.

[11] Patent Number: 4,494,806
[45] Date of Patent: Jan. 22, 1985

[54] SPRING LOADED DRAWER ASSEMBLY WITH MECHANICAL DAMPING

[75] Inventors: V. Harold Williams, Rockford; David L. Tomsu, Grand Rapids, both of Mich.

[73] Assignee: Leslie Metal Arts Company, Grand Rapids, Mich.

[21] Appl. No.: 494,414

[22] Filed: May 13, 1983

[51] Int. Cl.³ .............................................. A47B 21/04
[52] U.S. Cl. .................................. 312/333; 312/330 R
[58] Field of Search .......................... 267/154, 155; 292/DIG. 72; 464/24; 312/330, 333, 348

[56] References Cited

U.S. PATENT DOCUMENTS

| | | | |
|---|---|---|---|
| 872,050 | 11/1907 | Burhans | 182/239 |
| 2,459,012 | 1/1949 | Barth | 257/155 X |
| 2,775,445 | 12/1956 | Goodloe | 267/140.1 |
| 2,840,437 | 6/1958 | Cohen | 312/248 |
| 3,153,333 | 10/1964 | Chisholm | 267/155 X |
| 3,259,447 | 7/1966 | Deutsch | 312/348 |
| 4,320,934 | 3/1982 | Rock et al. | 312/348 |

Primary Examiner—William E. Lyddane
Assistant Examiner—Joseph Falk
Attorney, Agent, or Firm—Varnum, Riddering, Schmidt & Howlett

[57] ABSTRACT

A spring loaded drawer, such as an ashtray assembly (100) for use in automobiles or other vehicles includes a stationary frame (102) and a movable drawer (120) slidably mounted therein. A catch mechanism (164, 166, 168) releasably maintains the drawer (120) in a closed position. A damping assembly (180) mounted to the frame (102) includes an outer barrel (182), a rotatable inner barrel (190) interconnected to a gear (194) which engages a rack (160) mounted to the drawer (120), and a fluid-filled annular chamber (206) formed between the barrels (182, 190). When the catch mechanism (164, 166, 168) is released, a torsion spring (200) coupled to the inner barrel (190) is unloaded, causing the inner barrel (190) to rotate and the drawer (120) to move forward to an open position. The fluid within the annular chamber (206) produces a shear damping effect on the drawer movement. A lock bar (150) releasably maintains the drawer (120) in a fully open position and prevents inward drawer movement until the lock bar (150) is released by operator action.

16 Claims, 4 Drawing Figures

SPRING LOADED DRAWER ASSEMBLY WITH MECHANICAL DAMPING

DESCRIPTION

1. Technical Field

The invention relates to drawer assemblies and, more particularly, to drawer assemblies having automated movement with means to mechanically damp such movement.

2. Background Art

Numerous types of drawer assemblies have been developed for use in various environments, such as households, offices and vehicles. For example, drawer assemblies are utilized for combination cigarette lighter and ashtray assemblies (hereinafter referred to simply as "ashtray assemblies" or "ashtrays") employed in automobiles and similar vehicles. These vehicle ashtrays typically include a stationary frame mounted within a vehicle dashboard and a drawer having a cigarette lighter socket and ashtray mounting space supported within the frame so as to be hidden from view when not in use. The drawer is opened for use by extending the drawer forward from the stationary frame.

One problem with ashtrays and other devices within a vehicle passenger compartment is the inherent danger when the operator diverts his attention from driving the vehicle so as to operate the device. To at least partially overcome this problem, several types of vehicle ashtrays are automated so as to open in response to a relatively simple initial action by the vehicle operator or passenger. Drawer assemblies employed in household and other environments can also be similarly automated. For example, an ashtray can include an electric motor assembly or similar device to automatically extend the drawer forward of the stationary frame in response to initial actuation of the motor assembly by the operator.

Other types of automated vehicle ashtrays and non-vehicle drawer assemblies include purely mechanical assemblies to open the drawer in response to activation by the operator. The mechanical assemblies can include a releasable device for maintaining the ashtray drawer in a normally closed position and releasing the drawer in response to manual action, and an arrangement for forcing the drawer to an open position upon release. Such assemblies can include various arrangements of spring-loaded devices and the like.

However, one problem with purely mechanically automated ashtrays and other drawer assemblies is the speed at which the drawer is moved forwardly of the stationary frame. That is, spring-loaded assemblies adapted to move an object from an initial to a final position upon activation tend to cause the object to move rapidly. When these assemblies are adapted for use with ashtrays and other drawer assemblies, the rapid drawer movement can be somewhat dangerous to the operator and may lead to breakage or early wear of components. In addition, it is apparent such rapid movement may cause spillage if the tray is substantially full of discarded smoking materials or other items.

It is known to retard motion by means of fluid damping devices. For example, the U.S. Pat. No. to Rumsey 3,228,494, issued Jan. 11, 1966, discloses a viscous shear rotary damper to eliminate flutter in movable aircraft control surfaces. The rotary damper includes a high viscosity fluid within a chamber formed between a rotatable inner cylinder and a stationary outer cylinder. The inner cylinder is connected to a shaft externally mounted to the movable control surface. The viscous fluid provides a shear damping effect when the inner cylinder is made to rotate.

Another example of a fluid damping device is disclosed in the U.S. Pat. No. to Heckett 3,747,888, issued July 24, 1973. The Heckett patent describes a motorcycle seat suspension system having a fixed cylindrical housing half filled with viscous fluid. A rotating member having axially extending blades is mounted within the housing and a torsion spring extends between the rotating member and an adjustment wheel. The rotating member is connected to the seat frame so as to rotate and load the torsion spring when weight is applied to the seat. The fluid acting on the rotating member blades exerts drag to dampen seat frame movement. The torsion spring causes the seat to return to an initial position when weight is removed from the seat frame.

DISCLOSURE OF THE INVENTION

According to the invention, a drawer assembly comprising a stationary retainer frame and a drawer slidably mounted to the frame includes a damping means for damping the magnitude of velocity at which the drawer extends from the retainer frame. The assembly includes means for slidably mounting the drawer to the retainer frame so as to allow the drawer to move between a closed retracted position and an open extended position. Mechanical force means are mounted to the frame so as to exert mechanical forces on the drawer relative to the frame for extending the drawer from the closed position. The damping means are mounted to the frame and coupled to the mechanical force means for exerting shear stress forces opposing the exerted mechanical forces and damping the drawer extension velocity.

The damping means includes rotatable means coupled to the mechanical force means to provide a rotating surface when the drawer is extended forward from the retainer frame. The magnitude of the surface rotation velocity is related to the magnitude of drawer extension velocity. A stationary surface is adjacent the rotating surface and a hollow chamber is formed therebetween. A high viscosity fluid fills the hollow chamber and the size of the chamber and the fluid viscosity is such that rotation of the rotating surface during drawer extension produces shear stresses within the fluid which dampen the magnitude of rotation velocity and, correspondingly, the magnitude of drawer extension velocity.

In accordance with one embodiment of the invention, the rotatable means includes a cylindrical inner barrel concentrically mounted within a stationary outer barrel which is secured to the drawer frame. An annular fluid-filled chamber is formed between the barrels.

The mechanical means includes a torsional means connected to the retainer frame to exert torsional forces relative to the frame when the drawer is in a closed position and during drawer extension. Translation means are mounted to the drawer and coupled to the torsion means to translate the torsional forces to the mechanical forces so as to extend the drawer from the retainer frame. The torsional means can include a torsion spring having one end connected to the frame and torsionally wound when the drawer is in a closed position. The translation means is coupled to the torsion spring so as to exert the mechanical forces when the spring is torsionally unloaded. The translation means can include a gear coupled to the torsion spring and a rack mounted to the drawer and in mesh with the gear. Angular rotation of the gear in a first direction exerts a driving force on the rack and extends the drawer forward from the frame.

The assembly also includes a spring means mounted to the frame for releasably maintaining the drawer in a closed position. Catch means comprising a cam bracket mounted to the drawer releasably secure the spring means to the drawer. The bracket includes a cam-shaped lateral surface with a recess at a forward portion. The spring means includes a catch spring having one end hooked into the recess when the drawer is in a closed position. Rearward movement of the drawer from the closed position releases the spring from the recess.

The assembly also includes a locking means mounted to the drawer for releasably locking the drawer in the open position and preventing both forward and rearward drawer movement. Means responsive to operator action pivot and release the locking means to allow rearward drawer movement.

BRIEF DESCRIPTION OF THE DRAWINGS

The invention will now be described with reference to the drawings in which.

BEST MODE FOR CARRYING OUT THE INVENTION

Figure 1:
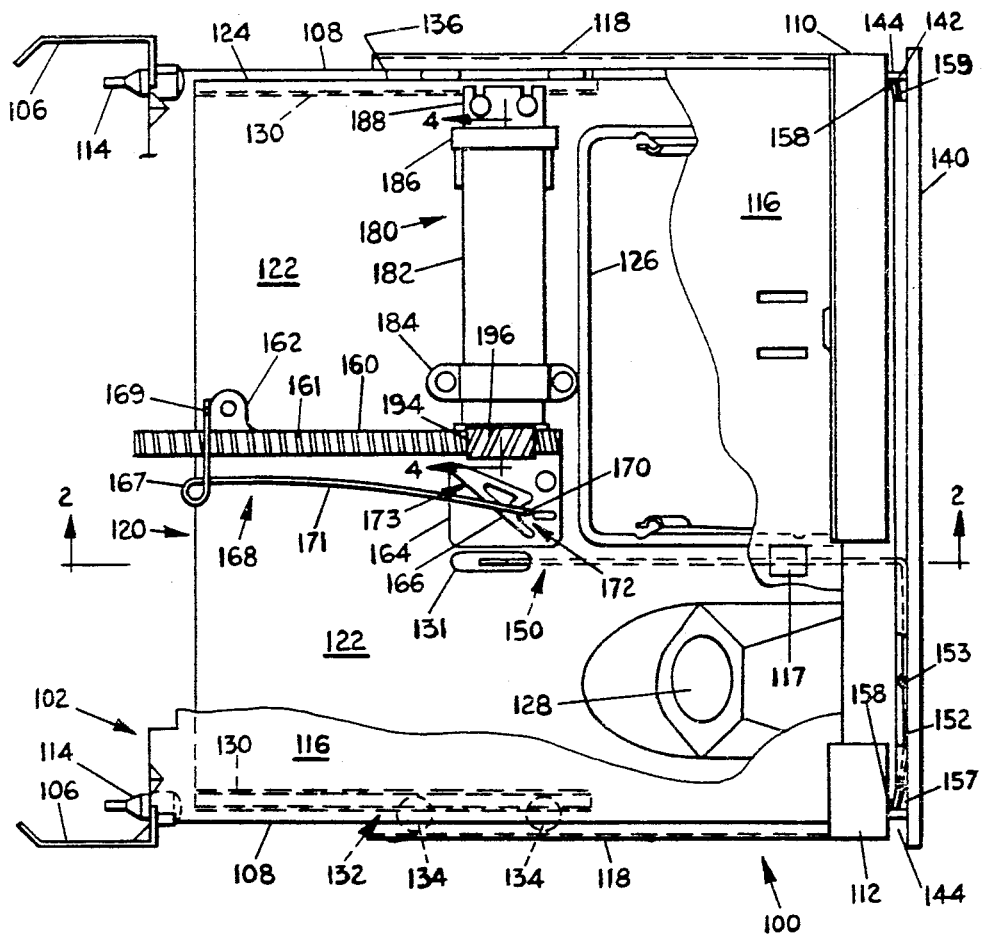
FIG. 1 is a plan view of a spring loaded ashtray drawer assembly with mechanical damping in accordance with the invention, and is depicted with a portion of a top plate of the ashtray frame cut away.

The principles of the invention are disclosed, by way of example, in an automated ashtray drawer assembly 100 as shown in the plan view depicted in FIG. 1. The ashtray assembly 100 can be used in a conventional passenger compartment of a vehicle and may be mounted within a dashboard (not shown) or other areas of the compartment so as to be readily accessible to vehicle passengers. For purposes of description, the "front" or "forward direction" of the ashtray assembly 100 as referred to herein is towards the right side of FIG. 1.

Figure 2:
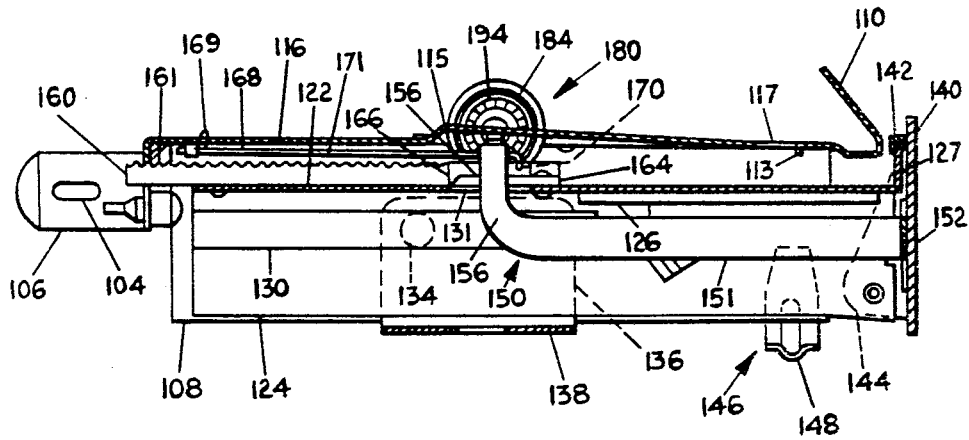
FIG. 2 is a sectional side view of the drawer assembly taken along lines 2—2 of FIG. 1.
Figure 3:
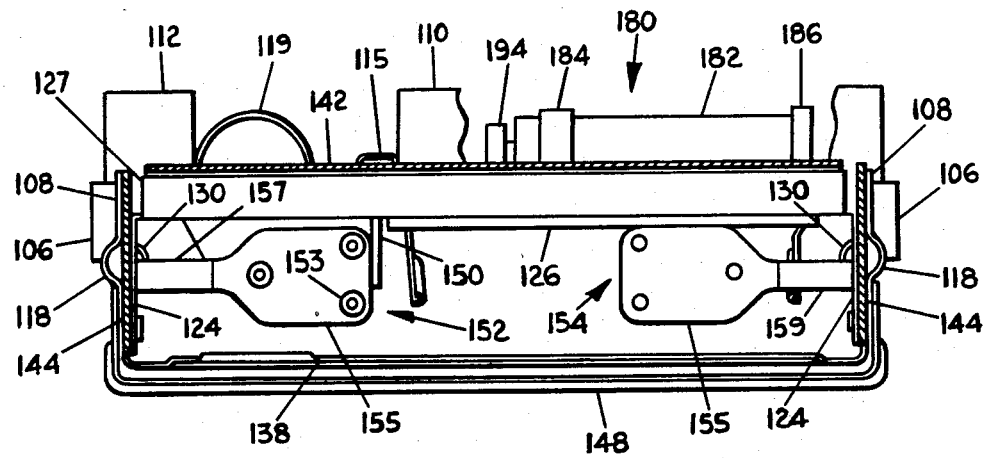
FIG. 3 is a front elevational view of the drawer assembly depicted in FIG. 1 with the front plate removed.

As depicted in FIGS. 1, 2 and 3, the ashtray assembly 100 includes a stationary retainer frame 102 having a pair of vertical side portions 108 with a horizontal upper plate 116 mounted to the top of each side portion 118 and positioned therebetween. The retainer frame 102 is adapted to be mounted within a hollow housing of a vehicle dashboard or other passenger compartment area. For this purpose, a pair of mounting brackets 106 are connected to the rear portions of the upper plate 116 and side portions 108. As shown in FIG. 2, each of the brackets 106 includes a slot 104 for bolting or otherwise securing the retainer frame 102 within the vehicle dashboard or other location within the passenger compartment. Secured to a front portion of each of the mounting brackets 106 is a bumper 114 to prevent damage and limit rearward movement of subsequently described components of assembly 100.

Integrally connected to the front portion of the upper plate 116 and angled upwardly therefrom is a front wide bracket 110 and a front narrow bracket 112. The brackets 110 and 112 are adapted to assist in mounting the retainer frame 102. As depicted in FIG. 3, integrally formed in the upper plate 116 between the brackets 110 and 112 is a cigarette lighter trough 119 to allow room for a conventional lighter (not shown) to extend above the general horizontal plane of the upper plate 116.

Also integrally formed in the upper plate 116 adjacent the cigarette lighter trough 119 is an elongated lever lock channel 115. As shown in FIG. 2, the channel 115 slopes downwardly towards the front of ashtray assembly 100. Aligned with the lever lock channel 115 and positioned immediately forward thereof is a rectangular slot 117 with a downwardly extending tab 113 located at the front portion of the slot 117. The purposes of the lever lock channel 115 and slot 117 will become apparent from subsequent description of the operation of ashtray assembly 100.

The side portions 108 of retainer frame 102 each include an outwardly recessed and horizontally disposed track channel 118. As shown in FIG. 1, the channels 118 each extend from the front of the corresponding side portion 108 to a position somewhat rearward of a lateral center line of the assembly 100. The channels 118 are adapted to assist sliding movement of other components of assembly 100 as subsequently described herein.

As depicted in FIGS. 1, 2 and 3, the ashtray assembly 100 includes a drawer 120 which is adapted to slide between a closed position and an open position relative to the retainer frame 102. The drawer 120 is depicted in its normally closed and retracted position in the drawings. The drawer 120 includes a pair of vertical side portions 124 positioned within the side portions 108 of stationary retainer frame 102. Mounted to the top of each of the side portions 124 and positioned therebetween is a horizontal upper drawer plate 122. As shown in FIG. 2, the upper drawer plate 122 terminates at its forward end in an integrally connected and upwardly extending vertical front bracket 127 which substantially extends the width of the upper drawer plate 122. Near the center of upper drawer plate 122 is an oval slot 131 which is aligned with a longitudinal center line of the lever lock channel 115 formed in the upper plate 116 of retainer frame 102.

Positioned rearward of the vertical front bracket 127 and formed within the upper drawer plate 122 is a conventional ashtray frame 126 and cigarette lighter socket 128, as depicted in FIG. 2. The ashtray frame 126 is adapted to receive a conventional ashtray (not shown) in a manner so that it is securely supported within the drawer 120 but manually removable for purposes of emptying. The cigarette lighter socket 128 is adapted to receive a conventional combination cigarette lighter and heating element (not shown).

The side portions 124 of the drawer 120 each include an inwardly recessed and horizontally disposed track channel 130. The drawer track channels 130 are disposed in substantially the same plane as the retainer frame track channels 118. The channels 130 extend from the rear of the side portions 124 to a location somewhat forward of the lateral center line of drawer 120.

The drawer 120 is adapted to slidably move relative to the stationary retainer frame 102 by means of a conventional ball track assembly 132. The ball track assembly 132 includes a pair of vertically disposed ball track brackets 136, each positioned between one of the side portions 108 of retainer frame 102 and an adjacent side portion 124 of the drawer 120. The ball track brackets 136 each include a pair of apertures in which a pair of balls 134 (shown in dotted lines in FIGS. 1 and 2) are secured so as to allow free rotation of the same. The brackets 136 are positioned in a manner so that the balls 134 are centered relative to the plane of the track channels 130 and track channels 118. Each of the balls 134 rotatably seats within one of the channels 118 and an adjacent channel 130. As depicted in FIG. 3, a horizontal connecting bracket 138 extends below and across the width of the drawer 120 and interconnects the ball track brackets 136. The ball track assembly 132 thereby provides a means for slidably moving the drawer 120 relative to the stationary retainer frame 102.

Referring specifically to FIGS. 1 and 2, the ashtray assembly 100 also includes a vertically disposed front plate 140 mounted to the front of assembly 100 and extending across the width thereof. A downwardly depending lip 142 extends rearwardly from the back surface of plate 140 near the upper end thereof. A pair of side mounting brackets 144 are connected to the ends of the front plate 140 and extend rearward therefrom. The mounting brackets 144 are each secured to a corresponding side portion 124 of the drawer 120 in a manner so as to allow pivotal movement of the plate 140 relative to drawer 120. Mounted rearward of the side mounting brackets 144 and secured to the side portions 108 of frame 102 is a support brace 146 having a cross bracket 148 as depicted in FIG. 3.

Referring to FIGS. 2 and 3, the ashtray assembly 100 includes a lever lock bar 150 having a horizontally disposed elongated portion 151 which is aligned with the lever lock channel 115 in the upper plate 116 of retainer frame 102. The lock bar 150 also includes a vertically disposed portion 156 integral with the rear of elongated portion 151 and extending upwardly through the oval slot 131 in the upper drawer plate 122 of drawer 120. With the drawer 120 locked and in a closed position as depicted in FIGS. 1-3, the terminating upper end of the vertical portion 156 extends slightly into the lever lock channel 115 of retainer frame 102.

The forward terminating end of the elongated portion 151 of lock bar 150 is connected in a perpendicular manner to a vertically disposed forward spring bracket 152. The configuration of spring bracket 152 is depicted in FIG. 3 and includes a rectangularly shaped portion 155 secured by means of rivets 153 to the front plate 140. For purposes of description, the front plate 140 has been removed from the view of the ashtray assembly 100 depicted in FIG. 3. One side of the rectangular portion 155 is integral with an elongated portion 157 which is slightly flexible and angled rearwardly. With the front plate 140 in a locked position as depicted in FIGS. 1 and 2, the laterally terminating end of the elongated portion 157 abuts an inwardly extending tab 158 connected near the front of the adjacent side portion 124 of drawer 120.

As depicted in FIG. 3, the ashtray assembly 100 includes a right-hand spring bracket 154 having a configuration corresponding to that of spring bracket 152. That is, the right-hand bracket 154 is riveted to the front plate 140 and includes a rectangular portion 155 and an elongated portion 159 angled rearwardly and abutting a tab 158 connected to the adjacent side portion 124 of drawer 120.

Referring to FIGS. 1 and 2, the ashtray assembly 100 further includes an elongated rack 160 having a substantially rectangular cross-sectional configuration and a series of rack teeth 161 on the upper portion thereof. The rack 160 is aligned with the longitudinal center line of drawer 120 and mounted to the top surface of the upper drawer plate 122 by means of a horizontally disposed connecting bracket 162. The rack 160 extends from the rear of drawer 120 to a location somewhat forward of the center of upper drawer plate 122.

At the forward portion of the rack 160 and extending laterally therefrom is a horizontally disposed catch plate 164 having a rectangularly shaped configuration. The catch plate 164 is rigidly mounted to the top surface of the upper drawer plate 122. Integral with the catch plate 164 and extending upwardly therefrom is a cam bracket 166 having a planar configuration as depicted in FIG. 1. A flexible and horizontally disposed catch spring 168 includes a downwardly extending forward end portion 170 which engages and rides on the outer surface of the cam bracket 166. As depicted in FIG. 1, the catch spring 168 includes a flexed elongated portion 171 extending rearward from the end portion 170 and terminating in a looped portion 167 which is wound around a post secured to the upper plate 116 of frame 102. The spring 168 also includes a rear end portion 169 which is hooked into and extends above the upper plate 116 of retainer frame 102.

Figure 4:
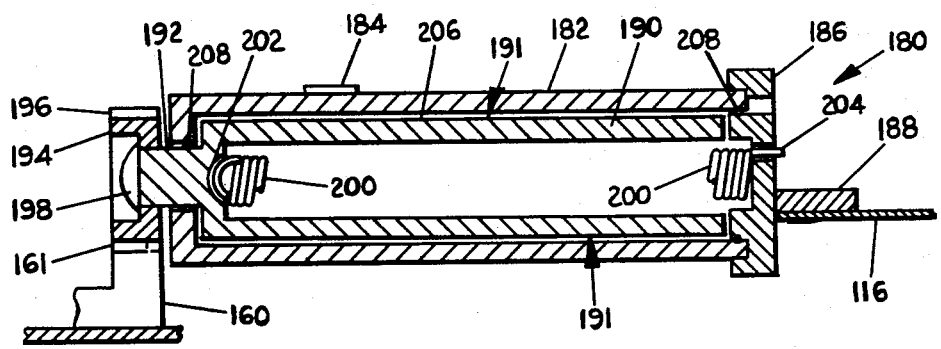
FIG. 4 is a sectional view of the damping assembly of the drawer assembly taken along lines 4—4 of FIG. 1.

In accordance with the invention, the ashtray assembly 100 further includes a rotary damper assembly 180 which is depicted in the detailed sectional view of FIG. 4. The damper assembly 180 includes a cylindrical outer barrel 182 mounted to the upper plate 116 of retainer frame 102 by means of strap 184. As depicted in FIGS. 1-3, the outer barrel 182 is mounted transversely on one side of the assembly 100 and aligned on or near a lateral center line of the upper retainer frame plate 116. Although not depicted in detail in the drawings, the upper retainer frame plate 116 includes an open channel having a perimeter substantially corresponding to the shape of the outer barrel 182 and including lower support braces so that the damper assembly 180 can extend below the horizontal plane of the upper retainer frame plate 116 in a secured manner.

As depicted in FIG. 4, one end of the outer barrel is secured within a cylindrical cap 186. The cap 186, in turn, is connected to a horizontally disposed mounting plate 188 which is rigidly secured in a conventional manner to the upper retainer frame plate 116.

The outer barrel 182 is substantially hollow and an inner rotator barrel 190 having an outer rotating surface 191 is concentrically mounted within the outer barrel 182. The rotator barrel 190 includes a hollow interior and is integrally connected at its end opposite the cap 186 to a shaft 192. The shaft 192 extends outwardly through the outer barrel 182 and receives a cylindrical gear 194 having teeth 196. The gear 194 is rigidly secured to the shaft 192 by means of a cap 198 or similar connecting means and the teeth 196 engage the teeth 161 of the previously described rack 160.

Near the end of the inner rotator barrel 190 connected to the shaft 192, a groove 202 is formed which is open to the hollow interior of barrel 190. One end of a coiled torsion spring 200 is mounted within the groove 202 so that the torsion spring 200 is loaded or unloaded by rotation of the inner barrel 190. The torsion spring 200 extends axially through the hollow interior of barrel 190 and its end opposite to the end mounted in groove 202 is rigidly secured within a stationary slot 204 in the cap 186.

The concentric configuration of the rotator barrel 190 within the interior of outer barrel 182 forms an annular chamber 206 between the outer rotating surface 191 of barrel 190 and an inner cylindrical surface of outer barrel 182. The chamber 206 is filled with a high viscosity fluid, such as liquid silicon. The siliconfilled chamber 206 is sealed at the ends of outer barrel 182 and the inner barrel 190 is rotatably mounted in outer barrel 182 by means of conventional O-rings 208.

The operation of the ashtray assembly 100 will now be described with respect to the drawings. The drawer 120 as depicted in FIGS. 1, 2 and 3 is in a closed and locked position, and retracted within the stationary retainer frame 102. In this position, the torsion spring 200 shown in FIG. 4 is in a wound, loaded configuration whereby unloading of the spring 200 causes rotation of inner barrel 190 in a counterclockwise direction as viewed in FIG. 2. With the gear 194 secured to the inner barrel 190 through shaft 192, and with the gear teeth 196 in mesh with the teeth 161 of rack 160, this counterclockwise rotation of inner barrel 190 would cause the rack 160 to be driven forward and the drawer 120 to be extended outward from retainer frame 102. However, with the catch spring 168 having its terminating end 170 secured in a recess 172 of cam bracket 166, forward movement of drawer 120 relative to retainer frame 102 is prevented. Accordingly, with gear 194 engaged with rack 160, the torsion spring 200 is prevented from unwinding and remains in a stationary loaded position.

To open the drawer 120 of ashtray assembly 100, the vehicle operator or passenger pushes rearward on the front plate 140. The drawer 120 will thereby be moved rearwardly a distance sufficient to cause the elongated portion 171 of catch spring 168 to spring to a straight, unbiased position, out of the recess 172 of cam bracket 166. The drawer 120 will thus be released from the holding force imparted by spring 168.

The slight rearward movement of drawer 120 will cause corresponding movement of rack 160 mounted thereto and gear 194, in mesh with rack 160, will rotate a slight angular distance in a clockwise direction as viewed in FIG. 2. This clockwise rotation will, in turn, produce a rotation of inner barrel 190 which will correspondingly add a small amount of loading on torsion spring 200.

Rearward movement of drawer 120 will be limited by contact of the side portions 124 with bumpers 114. When the operator releases the pushing force on plate 140, the drawer 120 will move forward and outwardly from retainer frame 102. The forward drawer movement will be caused by the spring 200 unwinding so as to relieve the loading tension. With one end of torsion spring 200 fixed to cap 186 and the opposing end secured in groove 202 to inner barrel 190 as shown in FIG. 4, the unwinding rotation of spring 200 will cause the inner barrel 190 to rotate relative to stationary outer barrel 182.

Rotation of inner barrel 190 will, in turn, rotate gear 194 mounted on shaft 192. With gear 194 engaged with rack 160, the gear rotation will drive the rack 160 forward. Correspondingly, the drawer 120 will slide forwardly relative to the retainer frame 102 through rotation of the balls 134 in ball track assembly 132.

As the drawer 120 moves forward, the upwardly extending portion 156 of lever lock bar 150 correspondingly moves forward within the lock bar channel 115 of retainer frame 102. With the channel 115 angled downwardly, the top of portion 156 will begin to contact channel 115 and the lock bar 150 will pivot downwardly. The downward movement of lock bar 150 will, in turn, slightly pivot the front plate 140 relative to drawer 120.

The drawer 120 will continue to move forward until the upwardly extending portion 156 of lock bar 150 is aligned under the rectangular slot 117 of retainer frame 102 and contacts the downwardly extending tab 113. With the portion 156 aligned under slot 117, the spring brackets 152 and 154 will cause the front plate 140 to return to an upright position as depicted in FIG. 2. Correspondingly, the lock bar 150 will move upward so that portion 156 extends into slot 117. This movement of lock bar 150 prevents the drawer 120 from additional forward movement. Accordingly, rotation of the gear 194 and the inner barrel 190 of damping assembly 180 will cease. The upward movement of lock bar portion 156 into slot 117 is limited by the returning movement of front plate 140 to an upright position and corresponding contact of lip 142 with the front bracket 127 of drawer 120.

Furthermore, the upward movement of lock bar 150 into slot 117 prevents the drawer 120 from moving rearwardly until bar 150 is released from slot 117 as subsequently described herein. The prevention of rearward drawer movement is important in that the vehicle operator can push inwardly on the cigarette lighter (not shown in the drawings) to activate the lighter heating element without simultaneously causing the drawer 120 to undesirably move inward.

The forward extending movement of drawer 120 is damped by the shear stresses produced in the viscous silicon fluid within the chamber 206 when the inner barrel 190 rotates relative to the outer barrel 192. The shear stresses of the fluid impart a force on the rotating surface 191 of barrel 190 which opposes the direction of angular rotation of barrel 190. These shear stresses thus produce a damping force which retards the magnitude of rotational velocity of the inner barrel 190 and, correspondingly, the magnitude of the velocity at which the drawer 120 extends forward from the retainer frame 102. Without the rotary shear damping effect provided by the shear stresses within the viscous fluid, the torsion spring 200 would tend to rapidly unwind and the drawer 120 would be extended forward at a substantially high and undesirable speed. Such rapid movement of the drawer 120 may tend to cause early wear and breakage of components of the ashtray assembly 100.

The magnitudes of the shear stresses and the corresponding damping forces will be dependent upon design variables such as the viscosity of the fluid, surface areas of barrels 182 and 190, volume of the annular chamber 206, the loading on spring 200 and the rotational velocity of inner barrel 190. The design of the damping assembly 180 to obtain the desired shear damping effect would be readily apparent to the person skilled in the art of fluid mechanics, given the description of ashtray assembly 100 herein.

In accordance with the foregoing, the rack 160, gear 194 and torsion spring 200 can be characterized as a mechanical force means to extend the drawer 120 forward from a closed position. Correspondingly, the barrels 182, 190 and the fluid filled chamber 206 formed therebetween can be characterized as a damping means to exert retarding forces opposing the forces exerted by the mechanical force means so as to dampen extension velocity of drawer 120.

To close and retract the drawer 120 into the retainer frame 102 after it has attained a fully open and locked position, the vehicle operator or passenger pushes on the upper portion of front plate 140 so as to pivot the plate 140 relative to drawer 120 through the support braces 146. The slight pivotal movement of front plate 140 will cause the upwardly extending portion 156 of lever lock bar 150 to retract downward from its locked position within slot 117 of retainer frame 102. With the portion 156 removed from the slot 117, the drawer 120 is free to move rearwardly and retract into the retainer frame 102. The vehicle operator continues to apply a pushing force on the front plate 140 which will cause the drawer 120 to slide rearwardly relative to retainer frame 102 through rotation of the balls 134 of ball track assembly 132.

As the drawer 120 is pushed rearwardly, the engagement of rack 160 with assembly gear 194 drives the gear 194 in a clockwise direction as viewed in FIG. 2. The rotation of gear 194, in turn, rotates the inner barrel 190 of damper assembly 180. With the torsion spring 200 secured at one end to the inner barrel 190, the spring 200 is wound and increasingly loaded as the drawer 120 is moved rearwardly.

When the drawer 120 is in its forwardmost position, the elongated portion 171 of catch spring 168 is substantially staight and its end portion 170 is spaced apart and rearward of the cam bracket 166. As the drawer 120 slides rearwardly, the cam bracket 166 also moves rearwardly and the end portion 170 will contact the lateral surface 173 of cam bracket 166. As the drawer 120 continues to move rearwardly, the configuration of the cam bracket 166 will cause the portion 171 to be flexed in a manner so that end portion 170 moves along the lateral surface 173.

The vehicle operator or passenger continues to push rearwardly on the front plate 140 until the drawer 120 has been retracted into the retainer frame 102 a distance sufficient to allow the end portion 170 of catch spring 168 to travel completely along the lateral surface 173 and return into the recess 172. When the operator then releases the rearward pushing force on front plate 140, the drawer 120 will tend to move slightly forward due to the loading of torsion spring 200 as previously described. However, the catch spring 168 will then be positioned so that its end portion 170 is within the recess 172 of cam bracket 166 and prevents forward movement of drawer 120. Additionally, when the vehicle operator releases the force applied to front plate 140, the spring brackets 152 and 154 will cause the front plate 140 to pivot slightly so as to return to the upright position depicted in FIG. 2.

Whereas the principles of a spring loaded drawer assembly with mechanical damping in accordance with the invention have been described herein with respect to the ashtray drawer assembly 100, these inventive principles can be applied to numerous other types of drawer assemblies. For example, automated drawer assemblies in accordance with the invention can be employed in vehicle glove boxes, office and household furniture items, and various other articles.

Whereas the invention has been described with respect to a rack and gear actuating means for the drawer, the actuating means could take the form of a braided or stranded wire cable, nylon cord, flat spring stock, etc. which would wrap around a drum fitted to the end of the torsional device.

It should also be emphasized that other mechanically damped drawer assemblies in accordance with the invention can utilize various types of drawers, retainer frames, supporting brackets and other components which differ from those described with respect to ashtray assembly 100. In addition, the drawer 120 can be supported relative to retainer frame 102 by means other than the conventional ball track assemblies 132 described herein. The particular mechanical assemblies and connection arrangements of ashtray assembly 100 are not meant to be an exhaustive enumeration of the particular structures which can be utilized with a drawer assembly in accordance with an invention. Accordingly, it will be apparent to those skilled in the pertinent art that modifications and variations of the abovedescribed illustrative embodiment of the invention can be effected without departing from the spirit and scope of the novel concepts of the invention.

The embodiments of the invention in which an exclusive property or privilege is claimed are defined as follows:

1. In a drawer assembly comprising a stationary retainer frame, a drawer, means for slidably mounting the drawer to the retainer frame so as to allow the drawer to move between a closed, retracted position and an open, extended position, means for releasably maintaining the drawer in the closed position, and mechanical force means mounted to the frame for exerting mechanical forces on the drawer relative to the frame so as to extend the drawer from the closed position, the improvement which comprises:

damping means mounted to the frame, coupled to the mechanical force means, and comprising a hollow fluid-filled chamber bounded by surfaces with a high viscosity fluid in the chamber, wherein shear stress forces are exerted by the fluid on at least one surface of the chamber for opposing the exerted mechanical forces and damping the magnitude of the velocity at which the drawer is extended from the retainer frame.

2. A drawer assembly in accordance with claim 1 wherein the damping means further comprises:

rotatable means coupled to the drawer for providing a rotating surface when the drawer is extended forward from the retainer frame, wherein the magnitude of surface rotation velocity is related to the magnitude of drawer extension velocity;

a stationary surface adjacent the rotating surface so as to form the hollow chamber therebetween; and the chamber is of a size so that rotation of the rotating surface during drawer extension produces shear stresses within the fluid which act between the rotating surface and the stationary surface to dampen the magnitude of rotation velocity and correspondingly dampen the magnitude of drawer extension velocity.

3. A drawer assembly in accordance with claim 2 wherein:

the rotatable means comprises a cylindrical inner barrel and the rotating surface corresponds to an outer cylindrical surface thereof;

the stationary surface corresponds to an inner cylindrical surface of a stationary outer barrel mounted to the retainer frame; and the inner barrel is concentrically mounted within the outer barrel and the chamber comprises an annular chamber formed between the inner barrel and outer barrel.

4. A drawer assembly in accordance with claim 1 wherein the mechanical force means comprises:
torsional means connected to the retainer frame for exerting torsional forces relative to the frame when the drawer is in a closed position and during drawer extension; and
translation means mounted to the drawer and coupled to the torsional means for translating the torsional forces to the mechanical forces so as to extend the drawer from the retainer frame.

5. A drawer assembly in accordance with claim 4 wherein the torsional means comprises a torsion spring having one end in a fixed position relative to the frame and torsionally loaded when the drawer is in a closed position.

6. A drawer assembly in accordance with claim 5 wherein the translation means is coupled to the torsion spring so as to exert the mechanical forces in response to the spring being torsionally unloaded.

7. A drawer assembly in accordance with claim 5 wherein the translation means comprises:
a gear coupled to the torsion spring; and
a toothed rack mounted to the drawer and in mesh with the gear so that angular rotation of the gear in a first direction exerts a driving force on the rack and extends the drawer forward from the retainer frame.

8. A drawer assembly in accordance with claim 4 wherein the damping means comprises:
rotatable means coupled to the drawer for providing a rotating surface when the drawer is extending forward from the retainer frame, wherein the magnitude of surface rotation velocity is related to the drawer extension velocity;
a stationary surface adjacent the rotating surface so as to form the hollow chamber therebetween; and
the chamber is of a size so that the rotation of the rotating surface during drawer extension produces shear stresses within the fluid which act between the rotating surface and the stationary surface to dampen the magnitude of rotation velocity and correspondingly dampen the magnitude of drawer extension velocity.

9. A drawer assembly in accordance with claim 8 wherein the mechanical force means comprises:
torsional means connected to the retainer frame and coupled to the rotatable means for exerting rotational forces on the rotatable means; and
translation means mounted to the drawer and coupled to the rotatable means for translating rotational movement of the rotatable means into forward extending movement of the drawer.

10. A drawer assembly in accordance with claim 9 wherein:
the rotatable means comprises a cylindrical inner barrel coupled to the torsional means and the rotating surface corresponds to an outer cylindrical surface thereof;
the stationary surface corresponds to an inner cylindrical surface of a stationary outer barrel mounted to the retainer frame; and
the inner barrel is concentrically mounted within the outer barrel and the chamber comprises an annular chamber formed between the inner barrel and outer barrel.

11. A drawer assembly in accordance with claim 10 wherein:
the torsional means comprises a torsion spring axially extending through the interior of the inner barrel and having one end secured to the inner barrel so that rotation of the inner barrel in a first direction causes unloading of the torsion spring; and
the translation means comprises a gear secured to the inner barrel and a toothed rack mounted to the drawer and in mesh with the gear so that angular rotation of the inner barrel in the first direction exerts a driving force on the rack and extends the drawer forward from the retainer frame.

12. A drawer assembly in accordance with claim 1 wherein the means for releasably maintaining the drawer in the closed position comprises:
spring means mounted to the frame for imparting a force to the drawer opposing forward movement of the drawer; and
catch means mounted to the drawer for releasably securing the spring means so as to maintain the drawer in the closed position.

13. A drawer assembly in accordance with claim 12 wherein:
the spring means comprises a catch spring having one end secured to the frame; and
the catch means comprises a cam bracket mounted to the drawer and having an irregular shaped lateral surface with a recess at a forward portion thereof, wherein another end of the spring is engaged in the recess when the drawer is in a closed position.

14. A drawer assembly in accordance with claim 13 wherein rearward movement of the drawer from the closed position releases the spring from the recess of the cam bracket.

15. A drawer assembly in accordance with claim 1 wherein the assembly further comprises locking means mounted to the drawer for releasably locking the drawer in the open position in a manner so as to prevent both forward and rearward movement of the drawer relative to the retainer frame.

16. A drawer assembly in accordance with claim 15 and further comprising means mounted to the drawer and responsive to operator action for pivoting and releasing the locking means so as to allow the drawer to slide rearwardly relative to the frame.

* * * * *